Figure 1:
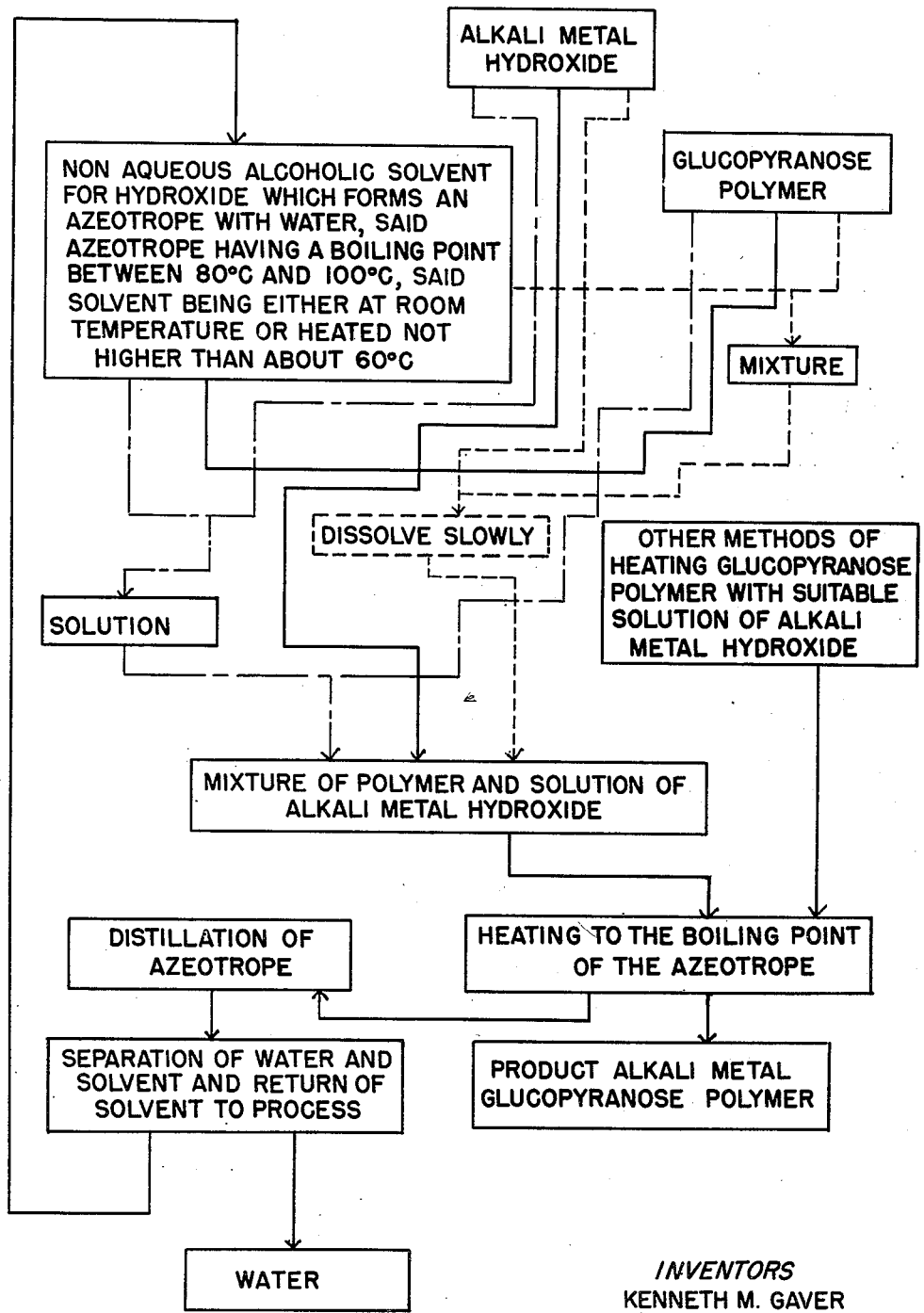

July 1, 1952     K. M. GAVER ET AL     2,602,084
PREPARATION OF 2-ALKALI CARBOHYDRIC DERIVATIVE
UTILIZING AZEOTROPIC DISTILLATION
Filed Jan. 29, 1951     2 SHEETS—SHEET 1

INVENTORS
KENNETH M. GAVER
ESTHER P. LASURE
LEVI M. THOMAS

BY    *Jerome R. Cox*
ATTORNEY

Patented July 1, 1952

2,602,084

UNITED STATES PATENT OFFICE 2,602,084

PREPARATION OF 2-ALKALI CARBOHYDRIC DERIVATIVE UTILIZING AZEOTROPIC DISTILLATION

Kenneth M. Gaver, Columbus, Esther P. Lasure, Grove City, and Levi M. Thomas, Columbus, Ohio, assignors to The Ohio State University Research Foundation, Columbus, Ohio, a corporation of Ohio Application January 29, 1951, Serial No. 208,328

15 Claims. (Cl. 260—233.3)

This application is in part a continuation of co-pending application Serial No. 24,628, now abandoned. The invention described in this application relates to glucopyranose polymers and other carbohydric materials and processes for the treatment thereof. It is illustrated by processes for the reaction of glucopyranose polymers by treatment with an alkali metal hydroxide in a non-aqueous solvent at temperatures ranging from 80° C. up to about 115° C. In the patent of Kenneth M. Gaver No. 2,518,135 and in applications of Kenneth M. Gaver et al. Serial Nos. 694,328, 781,708 (patent No. 2,572,923) and 31,696, and in our co-pending applications Serial Nos. 792,826, now abandoned; 13,958, now abandoned; 24,628 now abandoned, and 46,866, we have disclosed processes by which glucopyranose polymers and other carbohydric materials may be reacted with solutions of alkali metal hydroxide in non-aqueous solvents at temperatures ranging from 80° C. to about 115° C. In this applications and in the patent it has been shown that the reaction causes formation of an alkali metal carbohydric material and water by the substitution of the alkali metal in place of the hydrogen of the most acidic hydroxyl of the glucopyranose units of the original carbohydric material. In many carbohydric materials which may be so reacted, this most acidic hydroxyl is the hydroxyl which is adjacent to the carbonyl or potential carbonyl group of the units of carbohydric material.

By carbohydric material as above used and as used hereinafter in this specification and claims, we mean and we therefore define "carbohydric materials" to mean materials having saccharide units each having a plurality of linked carbon atoms, having one of these linked carbon atoms forming part of a carbonyl group, and having a carbon atom linked thereto on which there is positioned a hydroxyl group.

In the processes of forming alkali metal carbohydric materials described in the above mentioned applications, it was recognized that water was formed by the reaction and that an excess of water interfered with the reaction. We were therefore confronted with the problem of removing the water as it was formed or of limiting the reaction to relatively small quantities which could be separately dried. If we increased the temperature of the reaction mixture to a temperature above the boiling point of water to be sure to evaporate the water as formed, we found that in many cases we evaporated all of the solvent and used an excessive amount of fresh solvent, and in some cases induced undesirable alternative reactions.

It is an object therefore, to provide new methods of forming alkali metal derivatives of glucopyranose polymers and other carbohydric materials.

A further object of the invention is the provision of new methods of forming alkali metal carbohydrates and particularly alkali metal glucopyranose polymers and alkali metal starchates.

A further object of this invention is in the provision of such new methods of forming alkali metal carbohydrates, alkali metal glucopyranose polymers, and particularly alkali metal starchates by methods through which the amount of heat necessary to be used is economized.

Further objects and features should be apparent from the subjoined specification and claims and from the accompanying drawings illustrating embodiments of our invention.

Figure 2:
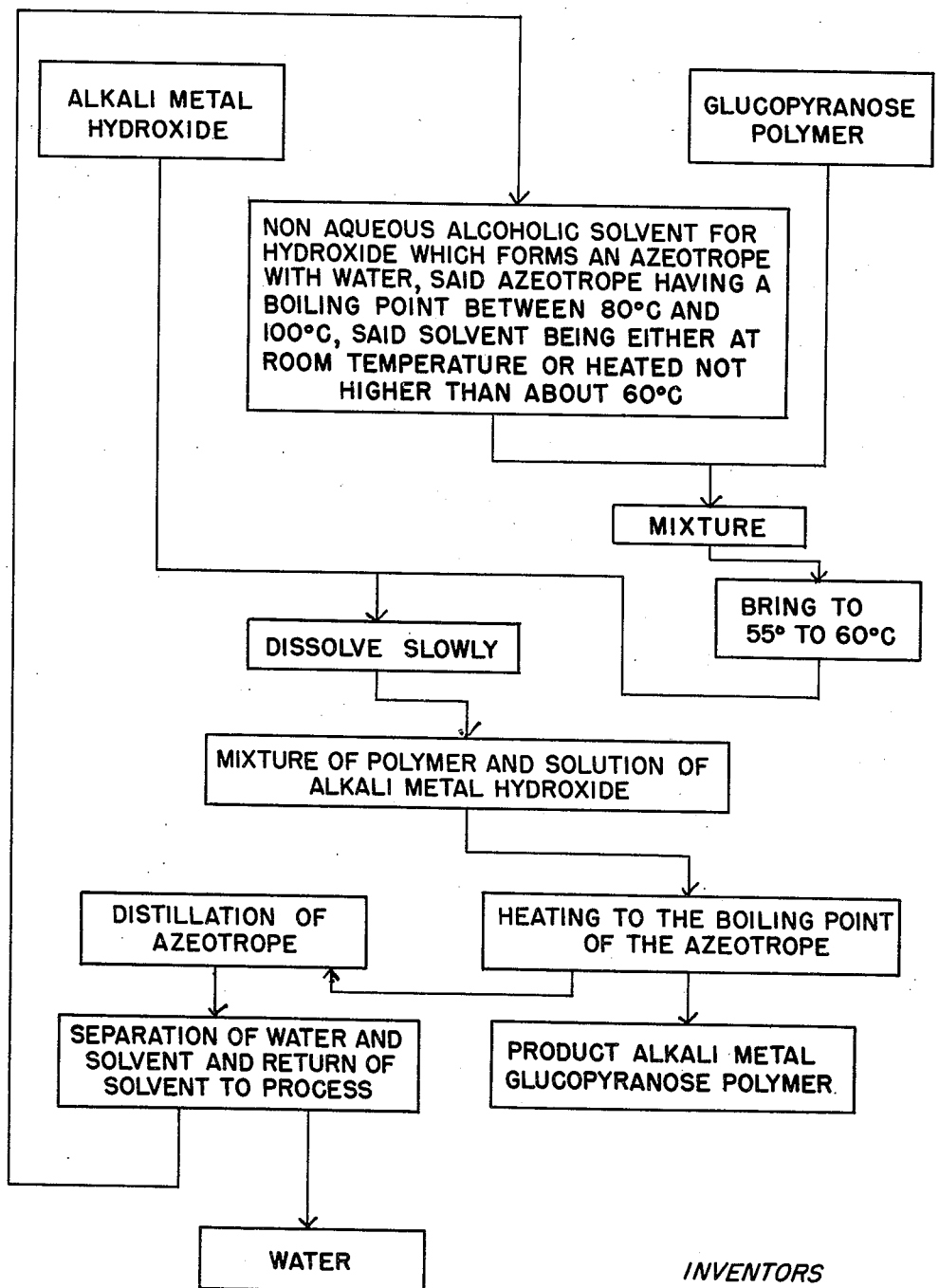

In the drawings:

Fig. 1 is a flow sheet illustrating several processes which are embodiments of our invention; and Fig. 2 is a flow sheet illustrating a preferred process which is also an embodiment of our invention.

As indicated in the drawings we may react any desired glucopyranose polymers. We may react other carbohydric materials. We utilize any desired alkali metal hydroxide. We select a solvent which boils within the desired range, forms an azeotropic mixture with water, and will dissolve the alkali metal hydroxide to an extent of at least an 0.04 N solution of sodium hydroxide. The temperature of the reaction should be between 80° C. and 115° C.

We have now discovered that in producing the reactions involved in the processes described in the above referred to applications and patent, processes may be expedited, the solvent may be more thoroughly utilized and more easily recovered, and the process in general may be performed more economically and expeditiously, by choosing a solvent which as an azeotrope of water forms a constant minimum boiling mixture with water, the boiling point of this azeotropic mixture lying between the approximate lower limit of the process (i. e., 78–81° C.) and the boiling point of water (i. e. 100° C.) and by maintaining the materials during the process at a temperature which is at least as high as the boiling point of the azeotropic mixture formed by the solvent and water.

As we have pointed out heretofore, one of the main factors in the success of our processes is the provision of a non-aqueous or substantially non-aqueous solvent and the removal of any water which may be formed in the process or which may be present in the reaction materials. We have found also that while any non-aqueous solvent which will dissolve the alkali hydroxide to an extent corresponding to a solution of 0.04 N solution of sodium hydroxide is satisfactory in our process, yet the alcohols which boil at temperatures ranging from 75° C. and 115° C. (such as ethanol, propyl alcohols, the butyl alcohols, the amyl alcohols, and to some extent the hexyl and heptyl alcohols) are most valuable. If with such solvents, however, the reaction mixture is heated to a temperature corresponding or approaching the boiling point of the solvent in an open system, not only is the water formed by the reaction process distilled off either as water alone or as azeotrope with the solvent, but also a large amount of the solvent is also distilled off. This creates corresponding difficulties and additional expense in the recovery of the solvent.

The carbohydric material which is to be reacted may be any carbohydrate or similar material in which there is a hydroxyl or a similar group positioned on a carbon which is adjacent to the carbon atom forming a part of the carbonyl group. For example, all glucopyranose polymers including starches, dextrins, celluloses, non-reducing sugars, simple glucosides, hexosans, pentosans and mixed hexosans and pentosans are usable. Similar reaction products can be prepared using waxy rice, yucca, sago, arrowroot, sweet potato, potato, corn, wheat, tapioca, and amioca starches; a series of thin boiling starches; wheat, potato, tapioca and corn dextrins; cotton, linen, jute and ramie; sucrose; dextran; α-methyl glucosides; and inulin, for example.

The alkali metal hydroxide might be any hydroxide of any of the alkali metals such as, for example, sodium hydroxide, potassium hydroxide, lithium hydroxide, rubidium hydroxide, and cesium hydroxide. In the practice of our invention according to the different embodiments thereof, a carbohydric material of the above described character may be treated with a solution of an alkali metal hydroxide as above described in a non-aqueous solvent at a temperature of from about 80° C. up to about 100° C. depending upon the solvent used and depending upon the boiling point of the azeotropic mixture formed by a mixture of the solvent and water. We prefer to add an alkali metal hydroxide slowly to a mixture of the carbohydric material with a non-aqueous azeotrope forming solvent and the heating to a temperature of the azeotropic boiling point.

The solvent for the hydroxide may be any solvent which forms an azeotropic mixture with water boiling within the required range and which will dissolve the alkali hydroxide to an extent comparable with an 0.04 N normal solution of sodium hydroxide. The solvent is preferably non-aqueous inasmuch as the presence of even a little water, while not absolutely blocking the reaction, yet is extremely deleterious and as little as about 10% of water prevents the reaction. The solvents that are preferred include, for example, those listed below. Many of the solvents listed are not comparable in utility, but each will function in our process, either alone, as a solvent or mixed with one or more of the others. In the following list, the boiling point in degrees centigrade of the azeotropic mixture thereof with water is placed after the name of each solvent:

| Solvent | B.P. |
|---|---|
| Propyl alcohol | 87.72 |
| Isopropyl alcohol | 80.38 |
| 2-methoxy ethanol | (1) |
| Butyl alcohol | 92.4 |
| Isobutyl alcohol | 89.92 |
| Secondary butyl alcohol | 83.5 |
| 2-ethoxy ethanol | 92.2 |
| Amyl alcohol | 95.95 |
| Isoamyl alcohol | 95.15 |
| 2-pentanol | 92.5 |
| Tertiary amyl alcohol | 87.35 |
| 3-pentanol | 91.7 |
| 3-methyl 2-butanol | 91.0 |
| Cyclohexanol | 97.8 |
| Hexyl alcohol | 97.8 |
| 2-ethyl 1-butanol | 96.7 |
| Benzyl alcohol | 99.9 |
| 1-heptanol | 98.7 |
| 1-octanol | 99.4 |
| 2-octanol | 98 |
| 2-ethyl 1-hexanol | 99.1 |

[1] Minimum boiling point.

Toluene and similar behaving materials are usable in conjunction with alcohols to get the desired azeotropic characteristics.

The preferred solvents are all alcohols and have high latent heat of vaporization which makes the process controllable. They are compatible with the system having such features as a lack of reactivity with the alkali, etherifying agents, reactants, product, and the glucopyranose polymer. The preferred range of the boiling point of the azeotrope is from 80° C. to 98° C. By these processes there is a slow evolution of water which is preferable. Inasmuch as the heat of vaporization varies approximately with the molecular weight and the boiling point of the solvent, these two factors can be considered in selecting a solvent which has a high latent heat of vaporization.

Any temperature from 80° C. up to about 115° C. is satisfactory for the reaction of the alkali metal hydroxide with glucopyranose polymers. Somewhere above about 115° C., side reactions occur. However, in order to take full advantage of our discoveries, we find that the operating temperature should be at or above the boiling point of the azeotrope formed between the solvent and water. That is to say that although the reaction occurs at a lower point than the operating temperature we prefer to operate at such higher temperature in order to remove the water as an azeotrope as it is formed. Also, it is desirable that the reaction temperature should be below the boiling point of the solvent alone in order to prevent loss of pure solvent. Therefore, preferably we raise the temperature to and maintain it slightly above the boiling point of the azeotrope of the azeotropic mixture formed by mixing the solvent with the water formed by the reaction. The time of the reaction is not material, provided the temperature of the reaction is at 81° C. or higher. At a temperature of about 80° C. the reaction is completed within about two hours. Above 81° C. the reaction is substantially instantaneous. The reaction is independent of alkali concentration and the same product is always obtained, provided there is sufficient alkali present to satisfy the requirements of the product. At the lower temperature ranges (i. e. at about 80° C.), it is desirable to use an excess of alkali in order to complete the reaction within a reasonable time. At higher temperatures (i. e. above 81° C.) only the amount of alkali approaching the stoichiometric equivalent is necessary or desirable.

By controlling the temperature of the reaction so that the reaction occurs at or slightly above the boiling point of the azeotropic mixture in question, it is possible to distil off all the water that is formed without distilling off any unnecessary amount of the solvent. At lower temperatures water formed by the reaction (or any other present in the mixture) is not removed. As the temperatures approach the boiling point of the solvent, unnecessary portions of the solvent are boiled and lost. In addition, such higher temperatures are undesirable due to the fact that the utilization of such higher temperatures are wasteful of heat. The failure to remove the water as formed impedes the progress of the reaction. The selection of a solvent which does not form a minimum constant boiling point mixture with water requires that the temperature of the reaction be carried out above 100° C. in order to remove the water by boiling it, which is uneconomical as compared with our improved process and also is inefficient in the removal of water. After removal of the azeotropic mixture by boiling, the pure solvent may be recovered in any desired manner. For example, we may allow the azeotropic mixture to cool and separate into two phases and then redistill each phase. We may redistil with a third compound which forms a ternary azeotrope with the two materials of the binary solvent-water mixture (i. e. by stripping). Toluene is useful in this connection as is well known in the art.

In the drawings there are illustrated various methods of treating glucopyranose polymer with a suitable solution of alkali metal hydroxide. For example, in Fig. 1, there is shown in full lines, the three constituents (consisting of (1) the nonaqueous alcoholic solvent for the hydroxide which solvent forms an azeotrope with water boiling between 80° C. and 100° C. preferably at room temperature but possibly heated not higher than 60° C., (2) the alkali metal hydroxide and (3) the glucopyranose polymers) are all mixed to form a mixture of polymer and the solution of the alkali metal hydroxide in the nonaqueous alcoholic solvent. This mixture is then heated to slightly above the boiling point of the azeotrope with a result that there is a distillation of the azeotrope consisting partly of water and partly of the solvent and leaving the alkali metal glucopyranose polymer as the product. The azeotrope may then be separated into water and solvent and the solvent returned to the process. The mixture of polymer and the solution of the alkali metal hydroxide in the nonaqueous alcoholic solvent may be accomplished in two steps if preferred. That is, as shown in dot-dash lines, the alkali metal hydroxide may be dissolved in the solvent and then this solution mixed with glucopyranose polymer. Alternatively, as shown in dotted lines, the glucopyranose polymer may be mixed with the nonaqueous alcoholic solvent and then the alkali metal hydroxide dissolved in the mixture. A preferred method of treating the glucopyranose polymer is shown in Fig. 2. The preferred method consists of (1) mixing the nonaqueous alcoholic solvent with the glucopyranose polymer, (2) then bringing the mixture to a temperature of about 55° to 60° C. and (3) then adding the alkali metal hydroxide slowly and dissolving slowly. When the process is performed in this way (1) the alkali dissolves more readily, (2) the heat of solution created by dissolving the alkali metal hydroxide is utilized to bring the mixture close to, or possibly to, the azeotropic boiling point, and (3) also the temperature is controlled so as to avoid (a) boiling away of the solvent or (b) reaction at too low a temperature with a resulting over-concentration of water. This process permits reacting the mixture with a higher concentration of the glucopyranose polymer, thus effecting a substantial saving in the size of equipment needed; the amount of solvent to be reclaimed per unit production; and in the amount of heat used when this process is applied in commercial production.

Thus we have disclosed a new and useful process for the reaction of carbohydric materials with alkali metal hydroxide. This process results in the formation of desirable products useful in sizing operations, as adhesives, as intermediates in the formation of plastics, and in various other ways, which process is much more efficient and economical than previously discovered processes therefor.

Following are examples of our improved processes:

Example I 200 grams of corn starch paste
40 grams of NaOH
900 ml. of butanol (anhydrous)

The above materials were mixed and the mixture was heated with vigorous agitation at about 95° C. whereby a reaction occurred in which 18 grams of water was liberated. Thereupon the water liberated in the reaction and also 17 grams of water which was contained in the reactants were removed through a vent in the reaction chamber as the butanol azeotrope (the azeotrope boils at 92.4° C.). The 17 grams of water contained in the reactants and about 90% of the 18 grams of water liberated in the reaction were removed from the mixture by the time the temperature of the reaction mixture reached 95° C. (vapors above the reaction were at 92.5° C. (corr.)). By holding the reaction mixture at 95° C. the rest of the water liberated by the reaction was azeotropically removed at a progressively reducing rate until, for all practical purposes, the system was anhydrous.

The sodium starch so produced was then reacted further to produce ethers. For example, to 10% of the above product, we added 10 ml. of ethylene chlorohydrin and continued to heat the mixture for two hours. We filtered out the reaction product, washed with butanol, then with ether and air dried. The product was a β-hydroxy ethyl starchate of which the air dry weight was 24.5 grams.

Example II 200 grams of (alkali converted) corn dextrin
40 grams of NaOH
900 ml. of amyl alcohol (anhydrous)

The above materials were mixed and the mixture was heated for two hours with vigorous agitation at about 96–98° C. whereby the water contained in the reactant plus the water evolved by the reaction are quickly and easily removed by the amyl azeotrope, B. P. about 96° C. The product was a sodium dextrinate. We then mixed the following in a separate container:

94.5 grams monochloroacetic acid
84 grams of sodium bicarbonate
200 ml. of amyl alcohol
200 ml. of toluene We used toluene to produce a mixed solvent in order to reduce the relatively high boiling point of amyl alcohol-water azeotrope. At the higher temperatures it was found that di- and tri-glycolates were formed more readily than the desired sodium monochloroacetate. The water of neutralization was removed as the water-toluene azeotrope boiling at about 84° C. After the monochloroacetic acid had been neutralized and the system made anhydrous, the monochloroacetate was added to the sodium dextrinate suspension.

This mixture was then heated for about four hours at 96–98° C. A dextrin monoglycolate was formed. This product was removed by filtration, washed with butanol and then with ether and air dried. The air dry weight was 318 grams.

Example III 200 grams of locust bean gum
56 grams of potassium hydroxide
900 ml. of ethylene glycol The above materials were mixed and the mixture was heated at 82–95° C. with vigorous agitation. As the temperature increased to 88° C., dioxane was added in a slow stream to the mixture. The water contained in the reactants as well as the water evolved from the reaction was readily removed as the dioxane-water azeotrope boiling at about 88° C. When the temperature of the atmosphere above the reaction exceeded 88° C. the flow of the dioxane was stopped and the reaction mixture was ready for further processing. The product was a potassium gum. This product was filtered off on suction and washed with dioxane. The washed filter cake was quickly transferred to a pressure bomb (glass lined), covered with 200 grams of methyl iodide, sealed and autoclaved at 100° C. for four hours. The bomb was cooled, opened and the excess methyl iodide was decanted off. The sodium iodide formed in the reaction was extracted with boiling acetone, the product was recovered by filtration, washed with acetone and oven dried. The product was a methyl gum having a weight of 195 grams (estimated 198 grams).

Example IV

A mixture of 170 grams of alkali soluble cellulose
1900 mm. butanol
55 grams potassium hydroxide was heated with vigorous agitation and distillation. As the temperature rose to 92° C. the water was removed as the butanol azeotrope. The product was filtered off, washed with a little butanol and ether and air dried with adequate protection from air, moisture and acidic gases. Air dry weight 202 (192 g. dry basis) and contained 31.3 grams of potassium corresponding to an 80.0% over all yield.

Example V

We mixed 50 grams of $a$-methyl glucoside
8 grams of NaOH
300 ml. of pentanol-3
100 ml. of dioxane.

We heated with vigorous agitation for 2 hours at a temperature of 95° to 98° C. and then added 25 ml. of ethylene chlorohydrin and continued the heating at 95° to 98° C. for about fifteen minutes when etherification was complete. We filtered, washed with pentanol and then with ether and air dried. The product was $\beta$-hydroxy ethyl-$a$-methyl glucoside. The air dry weight was 75 grams.

Example VI

We introduced 300 lbs. of predried locust bean gum into a reactor containing 150 gallons of normal butanol and agitated the mixture vigorously with slow heating to 60° C. The heat was then shut off and 60 lbs. of flake sodium hydroxide was added slowly over the course of thirty minutes. The reactor was then closed, heat again applied until a temperature of 95° C. was obtained. The mixture was held at this temperature until the reaction was completed and the liberated water was removed as the azeotrope. It may be noted that the holding temperature is dependent somewhat upon the equipment design. Only heat sufficient to raise the temperature above 92.5° C. is required to force the azeotrope (which has a boiling point of 92.5° C.) from the system without undue loss of non-azeotroped solvent.

Example VII

We mixed 1200 lbs. of powdered wheat starch and 600 gallons of pentanol-3. We agitated the mixture thoroughly for thirty minutes to permit complete dispersion of the small granules and then added 240 lbs. of flake sodium hydroxide. We slowly brought the temperature up to 60° C. and held it for thirty minutes to permit alkali diffusion to points of reaction. We checked the reactor to ascertain that the undissolved caustic had not settled to the bottom. We closed the reactor and heated to a temperature of 95° C. until the reaction was completed and the liberated water was removed as the azeotrope. Note that the holding temperature in some cases may have to be altered upward or downward depending upon the ease with which the azeotrope can be forced from the reactor. The reaction mixture was then cooled to 60° C. and 560 lbs. of beta chloropropionitrile was slowly run in. After the addition was completed, heat was again applied until the temperature of 95° C. was attained. The mixture was maintained at this temperature until the reaction was completed (i. e. about 15 to 20 minutes). The mixture was then cooled, filtered and dried. Dry weight was approximately 1800 lbs. of product, having about 6% volatiles at 105° C.

Example VIII

Nine hundred ml. of amyl alcohol and 40 grams of flake sodium hydroxide were stirred together until the alkali was thoroughly solvated which occurred in about thirty minutes. Two hundred grams of thin boiling wheat starch was added and the mixture slowly heated to about 60° C. (to permit diffusion) to carry the alkali to reaction sites and held at this temperature for about thirty minutes. Heat was again applied to bring the temperature of the mixture to 98° C. and hold it at this temperature until the azeotropic mixture had removed the liberated water from the system.

Example IX

Two hundred grams of milo starch, 700 ml. of butanol and 200 ml. of toluene were thoroughly mixed and warmed to 60° C. and then 40 grams of flake sodium hydroxide was added and the mixture held at this temperature for about thirty minutes. The heating was continued until the toluene-water azeotrope boiling point (i. e. 84° C.) was just exceeded and the mixture was held at this temperature until the liberated water was azeotropically removed.

Example X

A mixture of 200 grams of potato starch
900 ml. of pentanol-3
40 grams of flake caustic soda was warmed to 60° C. and held at that point for thirty minutes. The temperature of the mixture was raised to 98° C. and while maintaining this temperature, 200 ml. of toluene was slowly dripped into the reaction mixture whereby the water liberated by the reaction was removed azeotropically. The reaction mixture was cooled to 60° C. and maintained at this temperature while 190 ml. of ethylene bromide was slowly added. Mixture temperature was then slowly raised to 95° C. and held there for about one hour. It was then cooled, filtered and the product dried.

It may be noted that two or more solvents may be mixed and used and that solvents may be mixed with entraining agents such as toluene. In such cases either one of two things may happen. If two of the solvents or other materials combine with water to form a ternary constant boiling mixture having a boiling point lower than the boiling point of any of the constituents and lower than any binary azeotropic mixture thereof, such ternary mixture will be evaporated at such minimum boiling point. However, in many cases, no ternary azeotrope boiling at a lower point is formed and the water may then be eliminated together with a portion of only one of the solvents or other materials as a binary azeotrope. Such processes (i. e. the elimination of water either as an azeotrope consisting of water and two or more materials—ternary azeotropes, etc.— or as a binary azeotrope with only a portion of a selected one of the plurality of mixed materials) are considered to come within the scope of our inventions inasmuch as some of the most important advantages of such inventions are thereby secured. Such advantages include (1) the utilization of the heat which is necessary for driving the reaction to completion, also for the further purpose of eliminating (at a relatively low temperature) the water which is formed as a by-product of the reaction and (2) the concurrent or simultaneous elimination of water and completion of the reaction whereby because of the advantages accruing from anhydrous operation, the reaction is much more efficient than would be successive operations (i. e. the reaction followed by the elimination of water). It may be pointed out that a nonaqueous alcoholic solvent is necessary in order to dissolve the alkali hydroxide. However, with many of the alcohols, it is possible to retain more, or most, if not all, of the alcoholic solvent in the reaction mixture by adding a fourth non-alcoholic constituent to the alcohol-alkali hydroxide-glucopyranose mixture, so that the water as formed combines with the non-alcoholic material into a binary azeotropic mixture which boils at a lower point, or combines with the alcohol and the non-alcoholic material into a ternary azeotropic mixture which boils at a lower boiling point than the alcohol-water binary azeotrope. In some cases, the non-alcoholic material water azeotrope may boil at a lower point than the boiling point of any ternary azeotrope which might be formed therein. Thus the necessity of separating the alcoholic solvent may be eliminated, or if a ternary azeotrope is utilized (due to the smaller quantity of alcohol carried over) the separation problem may be minimized. Some of the materials which may be utilized as such a fourth component are set out below, the boiling point of the azeotropic mixture with water being placed after each material.

| | |
|---|---|
| Dioxane | 87.82 |
| 3-methyl-3-butene-2-one | 83 |
| 2,3-pentanedione | 86 |
| 3-pentanone | 82.9 |
| 2-pentanone | 82.9 |
| 2-hexanone | (1) |
| 4-methyl-2-pentanone | 87.9 |
| 3,3-dimethyl-2-butanone | 85 |
| 4-hydroxy-4-methyl-2-pentanone | 98.8 |
| 2,2-dimethoxy-3-butanone | 93.4 |
| Toluene | 84.1 |
| Anisole | 95.5 |
| 2,2-dimethoxy-3-pentanone | 96 |
| Tert-amyl ethyl ether | 81.2 |
| Dipropoxymethane | 92.2 |
| Diisopropoxymethane | 80 |
| Phenetole | 97.3 |
| Veratrole | 99.0 |
| 2-methylallyl ether | 92.5 |
| 2,2-diethoxy-3-butanone | 95.6 |
| Butyl ether | 93.5 |
| Isobutyl ether | 88.6 |
| Phenyl propyl ether | 98.5 |
| Dibutoxymethane | 98.2 |
| Diisobutoxymethane | 97.2 |
| Safrole | 99.72 |
| Isosafrole | 99.8 |
| Estragole | 99.3 |
| M-diethoxy benzene | 99.7 |
| Cineole | 99.55 |
| Linalool | 99.7 |
| 2,2-dipropoxy-3-butanone | 98.5 |
| Amyl ether | 98.4 |
| Isoamyl ether | 97.4 |
| 1-allyl-3,4-dimethoxy benzene | 99.85 |
| Isobornyl methyl ether | 98.55 |
| Diamyloxymethane | 99.2 |
| Diisoamyloxymethane | 99.3 |
| Phenyl ether | 99.33 |
| 2,2-dibutoxy-3-butanone | 97.99 |
| 2,2-diisobutoxy-3-butanone | 98 |

[1] Minimum boiling point.

While the forms of embodiments of the present invention as herein disclosed constitute preferred forms, it is to be understood that other forms might be adopted, all coming within the scope of the claims which follow:

We claim:

1. A process of forming a carbohydric derivative which comprises the steps of mixing a hydroxide of an alkali metal selected from the group consisting of sodium hydroxide, potassium hydroxide, cesium hydroxide, rubidium hydroxide and lithium hydroxide with glucopyranose polymers in a non-aqueous alcoholic system in which the alcohol is selected from the group consisting of 2-ethoxy ethanol, the propyl alcohols, the butyl alcohols, and the amyl alcohols, and in which the alcohol forms an azeotrope with water boiling between 80° C. and 100° C. thus dissolving the hydroxide and dispersing the starch in said solution; and maintaining the temperature of the mixture at least as high as the boiling point of the azeotrope and substantially in the range of between 80° C. and 100° C.

2. A process of forming a starchate, which comprises the steps of dispersing starch and dissolving an alkali metal hydroxide selected from the group consisting of sodium hydroxide, potassium hydroxide, cesium hydroxide, rubidium hydroxide and lithium hydroxide in a non-aqueous alcoholic system in which the alcohol is selected from the group consisting of 2-ethoxy ethanol, the propyl alcohols, the butyl alcohols, and the amyl alcohols, and in which the alcohol forms an azeotrope with the water boiling between 80° C. and 100° C.; and applying heat so that the temperature of the mixture is maintained at least as high as the boiling point of the azeotrope and substantially in the range of between about 80° C. and 100° C.; so as to accomplish the reaction between the hydroxide with the starch and to evaporate simultaneously the water formed by the reaction as an azeotrope with the alcohol.

3. A process of forming a starchate, which comprises the steps of dispersing starch and dissolving sodium hydroxide in butanol; and applying heat so that the temperature of the mixture is maintained substantially in the range of between about 80° C. and 100° C.; so as to accomplish the reaction between the hydroxide with the starch and to evaporate simultaneously the water formed by the reaction as an azeotrope with the alcohol.

4. In the process of forming a carbohydric derivative by the reaction of glucopyranose polymers with an alkali hydroxide in a non-aqueous alcoholic system where the hydroxide reacts with the carbohydric material to form water, where the alcohol in said system is selected from a group consisting of 2-ethoxy ethanol, the propyl alcohols, the butyl alcohols, and the amyl alcohols and boils at a temperature above the reaction temperature of the glucopyranose polymers with the hydroxide, where said alcohol forms an azeotrope with water formed by the reaction and where said azeotrope boils at a point intermediate the reaction temperature and the boiling point of the alcohol; the steps which comprise mixing glucopyranose polymers and an alkali hydroxide selected from the group consisting of sodium hydroxide, potassium hydroxide, cesium hydroxide, rubidium hydroxide and lithium hydroxide in said system to form a solution of said alkali hydroxide and thus mixing the hydroxide solution with said glucopyranose polymers; and maintaining the temperature of the mixture at a point at least as high as the reaction temperature of about 80° C. so as to form the carbohydric derivative and water and at least as high as the boiling point of the azeotrope but below the boiling point of the solvent and below 100° C.

5. In a process of forming a carbohydric derivative by the reaction of glucopyranose polymers in a non-aqueous alcoholic solution of an alkali hydroxide, where the hydroxide reacts with the glucopyranose polymers to form the derivative and water, where the solvent for the hydroxide is a non-aqueous alcoholic system of which the alcohol boils at a temperature above the reaction temperature of the glucopyranose polymers with the hydroxide, and forms an azeotrope with the water formed by the reaction, and where the azeotrope boils at a point intermediate the reaction temperature and the boiling point of the solvent; the steps which comprise dissolving a hydroxide selected from the group consisting of sodium hydroxide, potassium hydroxide, cesium hydroxide, rubidium hydroxide and lithium hydroxide in a non-aqueous system having an alcohol selected from the group consisting of 2-ethoxy ethanol, the propyl alcohols, the butyl alcohols, and the amyl alcohols; adding glucopyranose polymers to said solution; applying heat to react the hydroxide with the carbohydric material to form the derivative and water; and applying heat so as to maintain the temperature of the mixture at a point above the reaction temperature of about 80° C. and at least as high as the boiling point of the azeotropic mixture, but below the boiling point of the solvent and below 100° C.

6. A process of forming a carbohydric derivative which comprises the step of treating glucopyranose polymer with a solution of an alkali metal hydroxide in a non-aqueous alcoholic system in which the alcohol is selected from the group consisting of 2-ethoxy ethanol, the propyl alcohols, the butyl alcohols, and the amyl alcohols, and in which the alcohol forms an azeotrope with water boiling between 80° C. and 100° C. such treatment being at a temperature above the boiling point of the azeotrope and substantially in the range of between 80° C. and 100° C.

7. In a process of forming a carbohydric derivative by the reaction of glucopyranose polymer with an alkali hydroxide in a non-aqueous alcoholic system where the hydroxide reacts with the carbohydrate material to form water, where the alcohol in said system is selected from the group consisting of 2-ethoxy ethanol, the propyl alcohols, the butyl alcohols, and the amyl alcohols and boils at a temperature above the reaction temperature of the glucopyranose polymer with the hydroxide, where said alcohol forms an azeotrope with water formed by the reaction and where said azeotrope boils at a point intermediate the reaction temperature and the boiling point of the alcohol; the steps which comprise mixing glucopyranose polymer with an alcohol selected from the group consisting of 2-ethoxy ethanol, the propyl alcohols, the butyl alcohols, and the amyl alcohols to form a mixture, bringing said mixture to a temperature of about 55° C. to 60° C., dissolving an alkali metal hydroxide slowly in said mixture to provide a mixture of polymer and a solution of the alkali metal hydroxide; and maintaining the temperature of the mixture at a point at least as high as the reaction temperature of about 80° C. so as to form the carbohydric derivative and water and at least as high as the boiling point of the azeotrope but below the boiling point of the solvent and below 100° C.

8. A process of forming a carbohydric derivative which comprises the steps of mixing a hydroxide of an alkali metal with a mixture of glucopyranose polymers mixed in a non-aqueous alcoholic system in which the alcohol is selected from the group consisting of 2-ethoxy ethanol, the propyl alcohols, the butyl alcohols, and the amyl alcohols, and in which the alcohol mixes with water to form an azeotrope boiling between 80° C. and 100° C. and thus dissolving the hydroxide in the said starch dispersion; and heating the mixture so as to bring and maintain the temperature of the mixture at least as high as the boiling point of the azeotrope and substantially in the range of between 80° C. and 100° C.

9. A process of forming a carbohydric derivative which comprises the steps of mixing slowly a hydroxide of an alkali metal selected from the group consisting of sodium hydroxide, potassium hydroxide, cesium hydroxide, rubidium hydroxide, and lithium hydroxide with a mixture of glucopyranose polymers mixed in a non-aqueous alcoholic system and heated to a temperature of about 55° C. in which the alcohol is selected from the group consisting of 2-ethoxy ethanol, the propyl alcohols, the butyl alcohols and the amyl alcohols, and in which the alcohol forms an azeotrope with water boiling between 80° C and 100° C.; thus dissolving the hydroxide in said mixture; and applying heat so that the temperature of the mixture attains to and is maintained at a point at least as high as the boiling point of the azeotrope and substantially in the range of between 80° C. and 100° C.

10. A process of forming a starchate, which comprises the steps of dispersing starch in a non-aqueous alcoholic system; heating said mixture; dissolving slowly an alkali metal hydroxide selected from the group consisting of sodium hydroxide, potassium hydroxide, cesium hydroxide, rubidium hydroxide and lithium hydroxide in which the alcohol of the alcoholic system is selected from the group consisting of 2-ethoxy ethanol, the propyl alcohols, the butyl alcohols, and the amyl alcohols, and in which said alcohol forms an azeotrope boiling between 80° C. and 100° C. with water formed by the reaction; and applying heat so that the temperature of the mixture is maintained at least as high as the boiling point of the azeotrope and substantially in the range of between about 80° C. and 100° C., so as to accomplish a reaction between the hydroxide with the starch and to evaporate simultaneously the water formed by the reaction as an azeotrope with the alcohol.

11. A process of forming a starchate, which comprises the steps of dispersing starch in butanol; heating to a temperature of less than 60° C.; dissolving sodium hydroxide in the mixture; and applying heat so that the temperature of the mixture is maintained substantially in the range of between about 80° C. and 100° C., so as to accomplish the reaction between the hydroxide with the starch and to evaporate simultaneously the water formed by the reaction as an azeotrope with the alcohol.

12. In the process of forming a carbohydric derivative by the reaction of glucopyranose polymers with an alkali hydroxide in a non-aqueous alcoholic system where the hydroxide reacts with the carbohydric material to form water, where the alcohol in said system is selected from a group consisting of 2-ethoxy ethanol, the propyl alcohols, the butyl alcohols, and the amyl alcohols and boils at a temperature above the reaction temperature of the glucopyranose polymers with the hydroxide, where said alcohol forms an azeotrope with water formed by the reaction and where said azeotrope boils at a point intermediate the reaction temperature and the boiling point of the alcohol; the steps which comprise mixing glucopyranose polymers in said system; heating; dissolving an alkali hydroxide selected from the group consisting of sodium hydroxide, potassium hydroxide, cesium hydroxide, rubidium hydroxide and lithium hydroxide in said system to form a solution of said alkali hydroxide; and maintaining the temperature of the mixture at a point at least as high as the reaction temperature of about 80° C. so as to form the carbohydric derivative and water and at least as high as the boiling point of the azeotrope but below the boiling point of the solvent and below 100° C.

13. In a process of forming a carbohydric derivative by the reaction of glucopyranose polymers in a non-aqueous alcoholic solution of an alkali hydroxide, where the hydroxide reacts with the glucopyranose polymers to form the derivative and water, where the solvent for the hydroxide is a non-aqueous alcoholic system of which the alcohol boils at a temperature above the reaction temperature of the glucopyranose polymers with the hydroxide, and forms an azeotrope with the water formed by the reaction, and where the azeotrope boils at a point intermediate the reaction temperature and the boiling point of the solvent; the steps which comprise mixing glucopyranose polymers in a non-aqueous alcoholic system having an alcohol selected from the group consisting of 2-ethoxy ethanol, the propyl alcohols, the butyl alcohols, and the amyl alcohols; dissolving an alkali metal hydroxide slowly in said mixture; applying heat to react the hydroxide with the carbohydric material to form the derivative and water; and applying heat so as to maintain the temperature of the mixture at a point above the reaction temperature of about 80° C. and at least as high as the boiling point of the azeotropic mixture, but below the boiling point of the solvent and below 100° C.

14. In a process of forming a carbohydric derivative by the reaction of glucopyranose polymer with an alkali hydroxide in a non-aqueous alcoholic system where the hydroxide reacts with the carbohydrate material to form water, where the alcohol in said system is selected from the group consisting of 2-ethoxy ethanol, the propyl alcohols, the butyl alcohols, and the amyl alcohols and boils at a temperature above the reaction temperature of the glucopyranose polymer with the hydroxide, where a portion of said alcoholic system mixes with water formed by the reaction to form an azeotrope and where said azeotrope boils at a point intermediate the reaction temperature and the boiling point of the alcohol; the steps which comprise mixing glucopyranose polymer with an alcohol selected from the group consisting of 2-ethoxy ethanol, the propyl alcohols, the butyl alcohols, and the amyl alcohols to form a mixture, bringing said mixture to a temperature of about 55° C. to 60° C., dissolving an alkali metal hydroxide slowly in said mixture to provide a mixture of polymer and a solution of the alkali metal hydroxide; and maintaining the temperature of the mixture at a point at least as high as the reaction temperature of about 80° C. so as to form the carbohydric derivative and water and at least as high as the boiling point of the azeotrope but below the boiling point of the solvent and below 100° C.

15. A process of forming a carbohydric derivative which comprises the steps of treating glucopyranose polymer with a solution of an alkali metal hydroxide in a non-aqueous alcoholic system in which the alcohol is selected from the group consisting of 2-ethoxy ethanol, the propyl alcohols, the butyl alcohols, and the amyl alcohols, and in which the alcohol forms an azeotrope with water boiling between 80° C. and 100° C. such treatment being at a temperature above the boiling point of the azeotrope and substantially in the range of between 80° C. and 100° C.; and separating the alcohol of the azeotrope from the water thereof and returning the separated alcohol to the mixture.

KENNETH M. GAVER.
    ESTHER P. LASURE.
    LEVI M. THOMAS.

REFERENCES CITED

The following references are of record in the file of this patent:

UNITED STATES PATENTS

| Number | Name | Date |
|---|---|---|
| 2,244,680 | Engstrom et al. | June 10, 1941 |
| 2,374,455 | Porsche et al. | Apr. 24, 1945 |
| 2,397,732 | Gaver | Apr. 2, 1946 |

FOREIGN PATENTS

| Number | Country | Date |
|---|---|---|
| 359,641 | Great Britain | Oct. 29, 1931 |